(12) United States Patent
Gu et al.

(10) Patent No.: US 8,286,153 B2
(45) Date of Patent: *Oct. 9, 2012

(54) SYSTEMS AND METHODS FOR OPTIMAL COMPONENT COMPOSITION IN A STREAM PROCESSING SYSTEM

(75) Inventors: Xiaohui Gu, Chappaqua, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1225 days.

This patent is subject to a terminal disclaimer.

(21) Appl. No.: 12/061,284

(22) Filed: Apr. 2, 2008

(65) Prior Publication Data

US 2008/0188987 A1 Aug. 7, 2008

Related U.S. Application Data

(63) Continuation of application No. 11/068,785, filed on Mar. 1, 2005, now Pat. No. 7,562,355.

(51) Int. Cl.
*G06F 9/45* (2006.01)

(52) U.S. Cl. ........................................................ 717/151

(58) Field of Classification Search .................... 717/151
See application file for complete search history.

(56) References Cited

U.S. PATENT DOCUMENTS 7,840,431 B2 * 11/2010 Hacigumus .................. 705/7.37

OTHER PUBLICATIONS

M. Balazinska et al.,, "Contract-Based Load Management in Federated Distributed Systems", Proc. of 1st Symposium on Networked Systems Design and Implementations (NSDI, San Francisco, CA; Mar. 2004; 14 pages.

X. Gu et al., "QoS-Assured Service Composition in Managed Service Overlay Networks", Proc. of IEEE 23nd Int'l on Distributed Computing Systems (ICDCS 2003), Providence, RI; May 2003; pp. 1-8.

X. Gu et al., "SpiderNet: An Integrated Peer-to-Peer Service Composition Framework", Proc. of IEEE Int'l Symposium on High-Performance Distributed Computing (HPDC 2004), Honolulu, HI, Jun. 2004; 10 pages.

E. Kohler et al., "The Click Modular Router", ACM Transactions on Computer System 18 (3), pp. 263-297; Aug. 2000.

B. Raman et al., "Load Balancing and Stability Issues in Algorithms for Servce Composition", Proc. of IEEE INFOCOM 2003, San Francisco, CA Apr. 2003; 11 pages.

N. Tatbul, et al., "Load Shedding in a Data Stream Manager", Proc. of 29th Int'l Conf. on Very Large Data Bases (VLDB '03), Berlin, Germany, Sep. 2003; 12 pages.

* cited by examiner

*Primary Examiner* — John Chavis
(74) *Attorney, Agent, or Firm* — Tutunjian & Bitetto, P.C.; William J. Stock

(57) ABSTRACT

A system and method are provided for optimizing component composition in a distributed stream-processing environment having a plurality of nodes capable of being associated with one or more of a plurality of stream processing components. The system includes an adaptive composition probing (ACP) module and a hierarchical state manager. The ACP module probes a subset of the plurality of stream processing components to determine the optimal component composition in response to a stream processing request. The hierarchical state manager manages local and global information for use by said ACP module in determining the optimal component composition.

24 Claims, 5 Drawing Sheets

300

Input: Request $\langle \xi, Q^{req}, R^{req} \rangle$, deputy node $v_0$;
Output: best component composition $\lambda$.
1. $v_0$ creates the initial probe $P_0$
   Calculate probing ratio $\alpha$
   Create initial probe $P_0 = (\xi, Q^{req}, R^{req}, \alpha)$
2. Per-hop probe processing at node $v_i$
   $v_i$ checks resource / QoS conformance
   if the probed composition is qualified then
       Perform transient resource allocation
       Derive next-hop functions using $\xi$
       Discover next-hop candidate components
       Select good candidates using global state
       Spawn probes for selected components
       Update probes with fine-grain local states
       Send probes to their next-hop components
   else Drop the received probe P
3. $v_0$ selects the best component composition
4. $v_0$ establishes the stream processing session

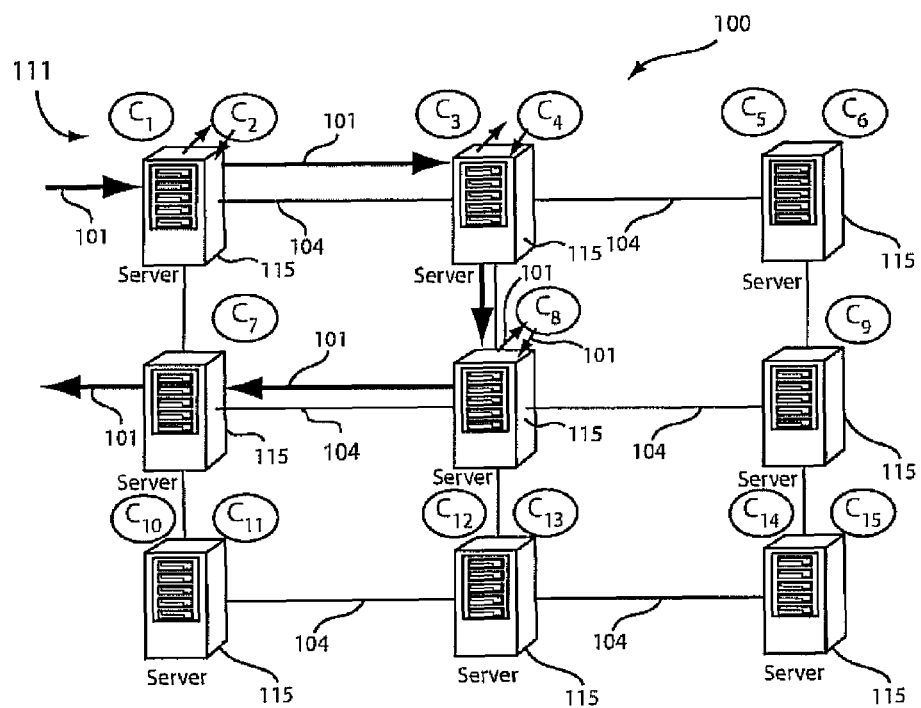
FIG. 1A
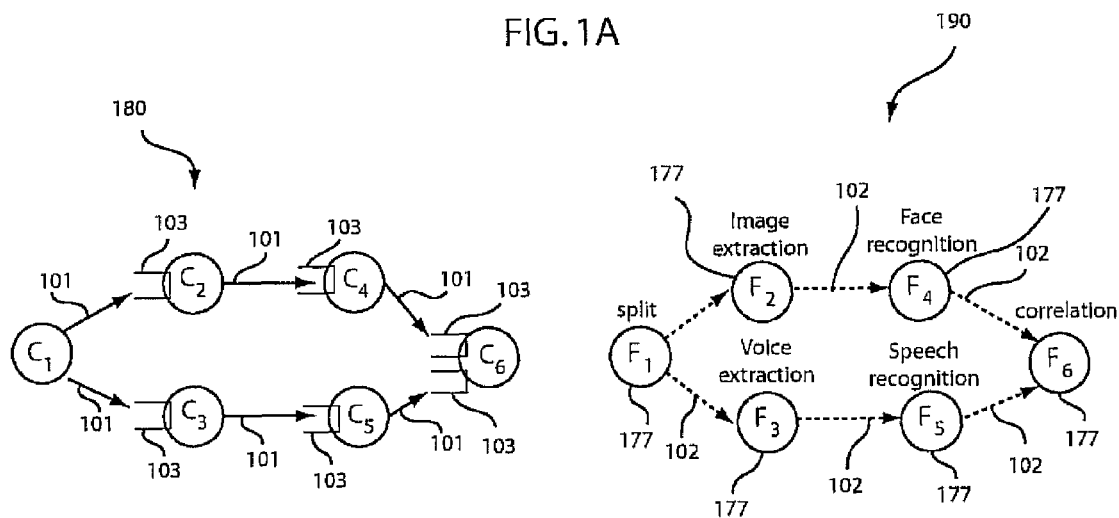
FIG. 1B
FIG. 1C

300

Input: Request $\langle \xi, Q^{req}, R^{req} \rangle$, deputy node $v_0$;
Output: best component composition $\lambda$.
1. $v_0$ creates the initial probe $P_0$
   Calculate probing ratio $\alpha$
   Create initial probe $P_0 = (\xi, Q^{req}, R^{req}, \alpha)$
2. Per-hop probe processing at node $v_j$
   $v_j$ checks resource / QoS conformance
   if the probed composition is qualified then
      Perform transient resource allocation
      Derive next-hop functions using $\xi$
      Discover next-hop candidate components
      Select good candidates using global state
      Spawn probes for selected components
      Update probes with fine-grain local states
      Send probes to their next-hop components
   else Drop the received probe P
3. $v_0$ selects the best component composition
4. $v_0$ establishes the stream processing session

FIG. 3

SYSTEMS AND METHODS FOR OPTIMAL COMPONENT COMPOSITION IN A STREAM PROCESSING SYSTEM

CROSS-REFERENCE TO RELATED APPLICATIONS

This application is a continuation of U.S. application Ser. No. 11/068,785, filed on Mar. 1, 2005 now U.S. Pat. No. 7,562,355, which is incorporated by reference herein in its entirety.

GOVERNMENT LICENSE RIGHTS IN FEDERALLY SPONSORED RESEARCH AND DEVELOPMENT

This invention was made with Government support under Contract No.: TIA H98230-04-3-0001 awarded by the U.S. Dept. of Defense. The Government has certain rights in this invention.

BACKGROUND

1. Technical Field

The description generally relates to stream processing and, more particularly, to systems and methods for optimal component composition in a stream processing system.

2. Description of the Related Art

Emerging applications such as trade surveillance for security fraud, network traffic monitoring for intrusion detection, sensor data analysis, audio/video surveillance, and value-added voice-over-IP services, call for sophisticated real-time processing on data streams. In these applications, data streams are continuously pushed to stream processing servers, where they are processed by self-contained stream processing elements called "components". Each component provides an atomic stream processing function such as filtering, aggregation, and correlation. Since stream applications are inherently distributed, stream processing should operate in a distributed fashion. Moreover, distributed stream processing systems provide better scalability and availability for resource-intensive and quality-sensitive stream processing applications. Thus, a challenging problem is to optimally compose distributed stream processing components into dynamically required stream processing applications.

Component composition has been studied under different contexts, such as service composition and systems software composition. The work on service composition is described, e.g., in the following articles, all of which are included by reference herein in their entireties: Raman et al., "Load Balancing and Stability Issues in Algorithms for Service Composition", Proc. of IEEE INFOCOM 2003, San Francisco, Calif., pp. 1477-1487, April 2003; Gu et al., "QoS-Assured Service Composition in Managed Service Overlay Networks", Proc. of IEEE 23rd International Conference on Distributed Computing Systems (ICDCS 2003), Providence, R.I., 194-201, May 2003; and Gu et al., "SpiderNet: An Integrated Peer-to-Peer Service Composition Framework", Proc. of IEEE International Symposium on High-Performance Distributed Computing (HPDC 2004), Honolulu, Hi., 110-119, June 2004. The work on systems software composition is described, e.g., in the following article which is included by reference herein in its entirety: Kohler et al., "The Click Modular Router", ACM Transactions on Computer Systems, 18(3), pp. 263-297, August 2000. Disadvantageously, the previous work falls short in addressing the optimization requirements in component composition, which is especially important for stream processing systems.

Previous work on stream processing has addressed problems such as load shedding and load migration. Load shedding is described, e.g., in the following article which is incorporated by reference herein in its entirety: Tatbul et al., "Load Shedding in a Data Stream Manager", Proc. of the $29^{th}$ International Conference on Very Large Data Bases (VLDB'03), Berlin, Germany, 309-320, September 2003. Further, load migration is described, e.g., in the following article which is incorporated by reference herein in its entirety: Balazinska et al., "Contract-based Load Management in Federated Distributed Systems", Proc. of $1^{st}$ Symposium on Networked Systems Design and Implementation (NSDI), San Francisco, Calif., 197-210, March 2004. Disadvantageously, the previous work does not address the optimal component composition problem.

Given the current state of the prior art, it would be beneficial and highly advantageous to have a system and method for optimal component composition in distributed stream processing environments.

SUMMARY

The present invention is directed to systems and methods for optimal component composition in distributed stream processing environment.

According to an aspect of the present invention, there is provided a system for optimizing component composition in a distributed stream-processing environment having a plurality of nodes capable of being associated with one or more of a plurality of stream processing components. The system includes an adaptive composition probing (ACP) module and a hierarchical state manager. The ACP module probes a subset of the plurality of stream processing components to determine the optimal component composition in response to a stream processing request. The hierarchical state manager manages local and global information for use by said ACP module in determining the optimal component composition.

According to another aspect of the present invention, there is provided a method for optimizing component composition in a distributed stream-processing environment having a plurality of nodes capable of being associated with one or more of a plurality of stream processing components. An adaptive composition probing (ACP) is performed which probes a subset of the plurality of stream processing components to determine the optimal component composition in response to a stream processing request. Local and global information are managed for use by the performing step in determining the optimal component composition.

According to yet another aspect of the present invention, there is provided a program storage device readable by machine, tangibly embodying a program of instructions executable by the machine to perform method steps for optimizing component composition in a distributed stream-processing environment having a plurality of nodes capable of being associated with one or more of a plurality of stream processing components. An adaptive composition probing (ACP) is performed which probes a subset of the plurality of stream processing components to determine the optimal component composition in response to a stream processing request. Local and global information are managed for use by the performing step in determining the optimal component composition.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1A is a block diagram illustrating a distributed stream processing system 100;

FIG. 1B is a component graph 180 of the distributed stream processing system 100 of FIG. 1;

FIG. 1C is a function graph 190 for the distributed stream processing system 100 of FIG. 1;

FIG. 3 is a diagram illustrating pseudo-code 300 for the ACP protocol;

DETAILED DESCRIPTION OF PREFERRED EMBODIMENTS

Figure 2:
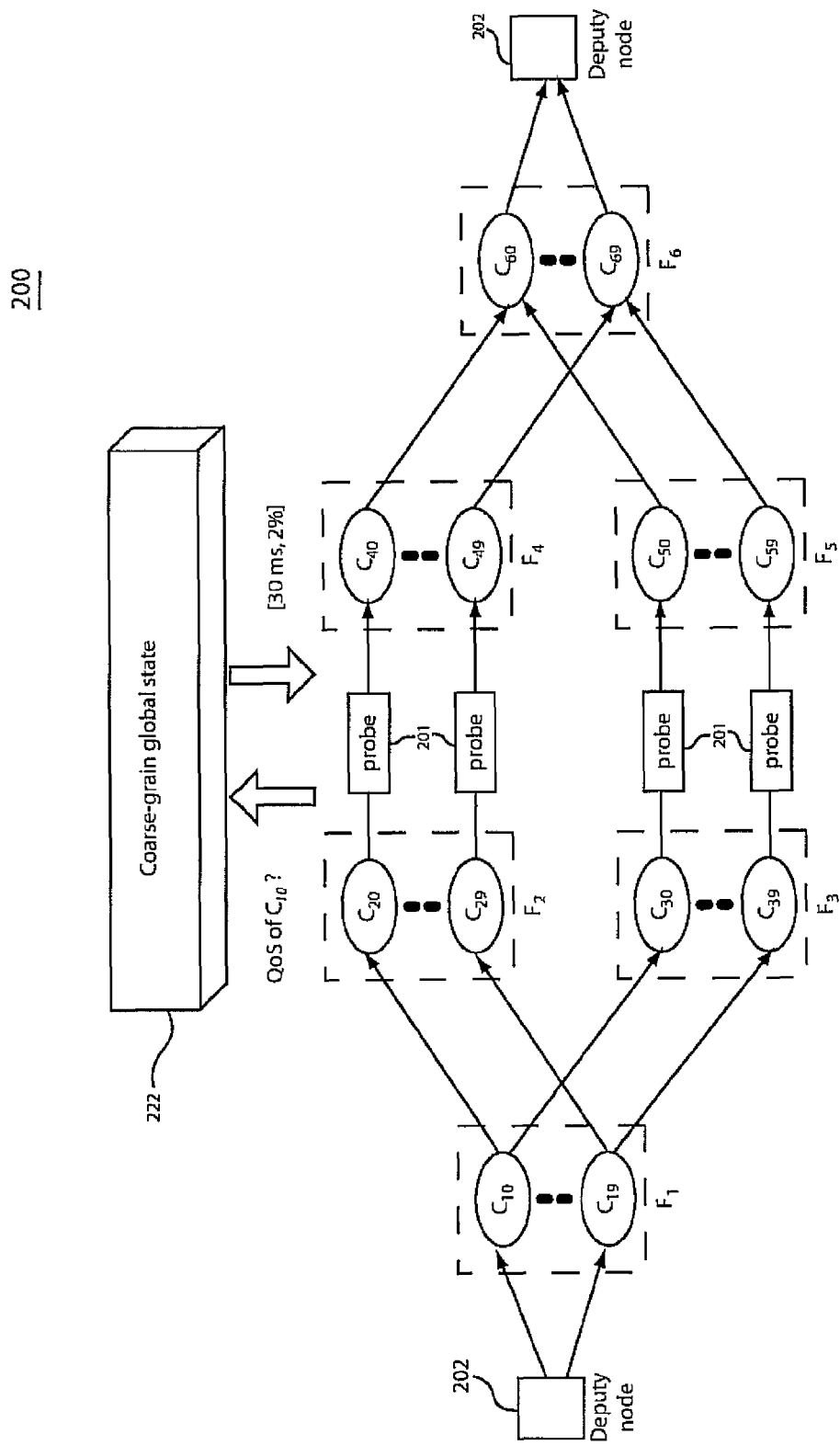
FIG. 2, which is a diagram illustrating an adaptive composition probing 200.

The present invention is directed to a system and method for optimal component composition in distributed stream processing environments.

In contrast to the prior art, the present invention provides an adaptive and real-time system and method that is capable of solving constrained optimization problem in component composition. Of course, given the teachings of the present invention provided herein, other applications therefore may also be employed with respect to the present invention while maintaining the scope of the present invention.

The present description illustrates the principles of the invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

A description will now be given regarding a distributed stream processing environment.

FIG. 1A is a block diagram illustrating a distributed stream processing system 100. FIG. 1B is a component graph 180 of the distributed stream processing system 100 of FIG. 1. FIG. 1C is a function graph 190 for the distributed stream processing system 100 of FIG. 1.

In FIGS. 1A through 1C, various components (stream processing elements) are designated by the reference characters $C_i$ disposed within a circle (where i is an integer), various functions of the various components are designated by the reference characters $F_i$ disposed within a circle, a data stream is designated by a solid thick line which is generally indicated by the reference numeral 101, an overlay link is designated by a solid thin line (i.e., thin with respect to the thicker line used to designated a data stream) which is generally indicated by the reference numeral 104), and functional dependencies are designated by a dashed line which is generally indicated by the reference numeral 102.

The distributed stream processing system 100 includes a set 111 of stream processing server nodes ($V_i$), each of which can be one or more computers (and thus are hereinafter interchangeably referred to as "computer", "node", or "server") 115. For failure resilience, distributed nodes 115 are connected using application-level overlay links ($e_j$) 104 into an overlay mesh. Each node 115 provides a few stream processing components $\{c_1, \ldots, C_k\}$. Each component provides an atomic stream processing function ($F_i$) such as filtering, aggregation, correlation, and audio/video analysis. Due to the constraints of security, software licenses, and hardware requirements, it is not presumed that each node can provide all stream processing components. The component composition process is to select and connect currently deployed components into user-required stream processing applications. Components can be dynamically migrated among nodes. The component composition operates based on the current component placement.

Each component receives continuous data units (e.g., data tuples, audio samples, video frames, and so forth) via input queues 103 from its preceding components, as illustrated in FIG. 1B. Each component has well-defined interfaces describing its input requirements (e.g., data format, stream rate, and so forth) and output properties. Each component is associated with a QoS vector $[q_1^{c_i}, \ldots, q_m^{c_i}]$ describing the QoS values of the component such as processing time and loss rate. The component can drop data units when it is overloaded, as described by Tatbul et al., in "Load Shedding in a Data Stream Manager", Proc. of the 29$^{th}$ International Conference on Very Large Data Bases (VLDB'03), Berlin, Germany, pp. 309-320, September 2003. Moreover, each component is associated with a resource availability vector $[ra_1^{c_i}, \ldots, ra_n^{c_i}]$ describing the current available resources (e.g., CPU, memory, and so forth) on the node providing $c_i$. Similarly, a QoS vector $[q_1^{e_i}, \ldots, q_m^{e_i}]$ and bandwidth availability $ba^{c_i}$ are also associated with each overlay link ($e_i$) 104.

A description will now be given regarding a composite stream processing service.

Distributed components can be dynamically composed into composite stream processing services. Generally, composition topology can be a directed acyclic graph (DAG), as illustrated in FIG. 1B. A component graph ($\lambda$) may be used to represent a composed stream processing application. Although the input queue 103 can accommodate transient stream rate mismatch, the input/output rates of two adjacent components must be compatible to provide continuous processing of long-lived data streams. Such a compatibility check is based on the interface specifications of the components. The input/output rates of the components are controlled by resource allocation policies. The QoS of a composed stream processing application is the QoS aggregation among its constituent components and overlay links. Herein, it is presumed that QoS metrics are additive and minimum-optimal. Non-additive metrics (e.g., loss rate, and so forth) can be made additive and minimum-optimal using logarithm and inverse transformations. The connection between two adjacent components is called a virtual link ($l_i$), which includes a set of overlay links. The QoS of the virtual link $q_1^{l_i}, \ldots, q_m^{l_i}$ is the QoS aggregation among its constituent overlay links and its bandwidth availability $ba^{l_i}$ is the bottleneck bandwidth among the overlay links. If two adjacent components are co-located on the same machine, the virtual link is considered to have 0 network delay and—bandwidth availability.

A description will now be given regarding the problem of optimal component composition.

The problem of optimal component composition is to map a function graph into a component graph in the distributed stream processing system based on resource and QoS constraints and an optimization objective function. The function graph 190 illustrated FIG. 1C represents the stream processing function requirements of a user. Each node 177 in the function graph 190 denotes an atomic stream processing function such as aggregation, filtering, and correlation. Each function node 177 can be mapped to multiple candidate components on different processing nodes. The optimal component composition has two principle goals. First, the composed stream processing application should satisfy the function, QoS, and "resource requirements" (the latter also referred to as "resource needs") of the user. Second, the stream processing application should be instantiated on least loaded nodes and virtual links for balanced load distribution. The residual end-system resources on the node providing $c_i$ are defined using $[rr_1^{c_i}, \ldots, rr_n^{c_i}]$. The residual bandwidth on the virtual link $l_i$ is defined using $rb^{l_i}$. The residual resources are the remaining resources after the required resources are subtracted from current available resources on the corresponding nodes and virtual links. Residual resources are used instead of currently available resources for accommodating component co-locations, as further described herein. The required end-system resources for the component $c_i$ are defined using $R^{c_i} = [r_1^{c_i}, \ldots, r_n^{c_i}]$. The bandwidth requirement for the virtual link $l_i$ is denoted by $ba^{l_i}$. The stream processing function provided by the component $c_i$ is denoted by $c_i.f$.

Thus, the optimal component composition problem can be formally defined as follows: Given a distributed stream processing system G=(V,E) where V denotes the set of |V| stream processing nodes ($v_i$) and E denotes the set of |E| overlay links ($e_i$). Given a stream processing request denotes the set of |C| stream processing components ($c_i$) and L denotes the set of |L| inter-component virtual links ($l_i$) such that $$\min \phi(\lambda) = \sum_{c_i \in \lambda} \sum_{k=1}^{n} \frac{r_k c_i}{rr_k c_i + r_k c_i} + \sum_{l_i \in \lambda} \frac{b^{l_i}}{rb^{l_i} + b^{l_i}} \quad (1)$$

subject to $$c_i \cdot f = F_i, \forall F_i \in \xi, \exists c_i \in \lambda \quad (2)$$

$$q_i^\lambda \le q_i^{req}, 1 \le i \le m \quad (3)$$

$$rr_k^{c_i} \le 0, 1 \le k \le n, \forall c_i \in \lambda \quad (4)$$

$$rb^{l_i} \le 0, \forall l_i \in \lambda \quad (5)$$

Generally speaking, the optimal component composition problem is a multi-constrained optimization problem, which optimizes a global system metric subject to a set of constraints. Herein, the optimization goal is to minimize the congestion aggregation metric $\phi(\lambda)$ defined by Equation 1 for balanced load distribution. The smaller the congestion aggregation metric is, the better load distribution the composition presents, since the stream processing application on the nodes and virtual links are instantiated with larger residual resources. The constraints include the function of the user, and QOS and resource constraints for the composed stream processing application. Equation 2 defines that the component graph $\lambda$ should provide all stream processing functions specified in the function graph $\xi$. Equation 3 specifies that the QoS of the composed stream processing application $q_1^\lambda, \ldots, q_m^\lambda$ processing time, loss rate) should satisfy the user QoS requirements $[q_1^{req}, \ldots, q_m^{req}]$. Equation 4 and Equation 5 specify that user required system resources and bandwidth resource should be satisfied (i.e., residual resources should not be negatives).

A general description of the present invention will now be provided, following by more detailed descriptions of various aspects thereof.

Herein, an optimal component composition system and method are provided that use adaptive composition probing (ACP). ACP can efficiently discover a set of "good" candidate component compositions among which the best composition is selected. ACP addresses two key decision-making problems: (1) how many candidate components to probe; and (2) which candidate components to probe. To accommodate dynamic stream processing systems, ACP adaptively adjusts the probed component number to maintain target composition performance with minimal probing overhead. For scalability, ACP selects good candidate components to probe under the guidance of a coarse-grain global state.

A description will now be given regarding system Application Programming Interfaces (APIs).

The user can specify the stream processing request in terms of: (1) function requirements described by a function graph ($\xi$); (2) QoS requirements ($Q^{req}$); and (3) resource requirements ($R^{req}$). The function graph 190 illustrated in FIG. 1C defines a stream processing application template, which can be provided by the application developer. The function graph 190 includes a set of function nodes ($F_i$) 177 connected by dependency links 102. In contrast to conventional request-response middleware interface, stream processing middleware provides the following three session-oriented interfaces.

The first interface, namely Session ID=Find ($\xi, Q^{req}, R^{req}$), invokes the optimal component composition algorithm to find the best component graph $\xi$. If the composition is successful, then the middleware creates a session record with a session identifier (sessionId) for the user request. Otherwise, a null sessionId is returned to indicate composition failure.

The second interface, namely Process (sessionId, data streams), starts the continuous data stream processing using the composed component graph. The middleware can map the session identifier to the component graph composed by the previous step.

The third interface, namely Close (sessionId), tears down the stream processing session when the application finishes its task. The corresponding session information is deleted from the session table.

A description will now be given regarding an overview of adaptive composition probing (ACP).

The basic idea of the ACP approach is to use a number of probing messages, called probes, to dynamically discover a set of good candidate compositions among which the best composition is selected. The probing process concurrently examines different compositions and collects precise state information from good candidate components. For scalability, ACP avoids brute-force exhaustive probing by performing adaptive selective probing. ACP addresses two key decision-making problems in composition probing: (1) how many candidate components should be probed and (2) which candidate components should be probe.

Intuitively, the more candidate components that are probed, the better component composition can be discovered. However, the probing overhead also becomes larger when more candidate components are probed. A probing ratio $\alpha \in (0,1]$ is introduced to define the percentage of the candidate components probed for each function. For example, if there are ten candidate components for the function $F_i$ and the probing ratio $\alpha=0.3$, then $0.3 \times 10 = 3$ candidate components can be probed. ACP adaptively adjusts the probing ratio based on the target composition performance and current system conditions, which are described further herein.

Next, it is to be decided which candidate components to probe for maximizing the probability of finding the best composition. A hierarchical state management scheme is described herein to assist ACP in optimal component composition. The hierarchical state management maintains precise local state at each node and a coarse-grain global state, which is described further herein. Hence, ACP can select good components to probe under the guidance of the coarse-grain global state and select optimal component composition based on precise states collected by the probes. The candidate component selection is described further herein.

A description will now be given regarding ACP protocol.

When a stream processing request is submitted, the request is redirected to a node that is closest to the client based on a predefined proximity metric (e.g., geographical location, and so forth). The selected node, called the deputy node 202 (see FIG. 2), initiates the ACP protocol to discover the optimal component composition. FIG. 3 is a diagram illustrating pseudo-code 300 for the ACP protocol. Four steps are shown in FIG. 3. Each of these steps will now be described.

Regarding step 1 (initialization) in FIG. 3, given the component composition request, the deputy node 202 first selects a proper probing ratio for the request, which is further described herein below. The probing ratio decides the number of candidate components that are to be probed for each required function. Next, the deputy node creates a probing message ($P_0$) that carries the composition request information (e.g., the function graph $\xi$, QoS constraints $Q^{req}$ resource constraints $R^{req}$, and so forth), and the probing ratio $\alpha$. The ACP protocol then enters the next step: distributed hop-by-hop probe processing. The probes will visit a number of selected candidate components to collect precise QoS/resource states.

Regarding step 2 (per-hop probe processing) in FIG. 3, when a node $v_i$ receives a probe $P_i$, the node processes the probe independently based on the information carried by the probe, the local state, and the coarse-grain global state 222 (it is to be noted that this step also applies to the deputy node). First, $v_i$ checks whether or not the QoS/resource values of the probed partial stream processing application already violate the required QoS/resource values. If the QoS/resource values are already unqualified, then the probe is dropped immediately to reduce the probing overhead. Otherwise, the node performs transient resource allocation to avoid conflicting resource admission caused by concurrent probings for different requests. To avoid redundant resource allocation, each node only temporarily reserves resources once for each component in each request. The transient resource allocation will be cancelled after a timeout period if the node does not receive a confirmation message. Second, $v_i$ derives the next-hop functions using the function graph $\xi$. The functions dependent on the current function are the next-hop functions. Third, $v_i$ acquires the locations of all available candidate components for each next-hop function using a decentralized service discovery system. For a description of a decentralized service discovery system, see Gu et al., "SpiderNet: An Integrated Peer-to-Peer Service Composition Framework", Proc. of IEEE International Symposium on High-Performance Distributed Computing (HPDC 2004), Honolulu, Hi., 110-119, June 2004. Fourth, $v_i$ selects a number of "good" candidate components to probe, based on the probing ratio and the global state. The candidate component selection is further described herein below. Fifth, $v_i$ "spawns" new probes from $P_i$ for all selected next-hop candidate components. Each new probe 201 collects fine-grain local states from $v_i$ and inherits the states collected by its parent probe. Finally, $v_i$ sends all new probes 201 to the selected next-hop components.

Figure 4:
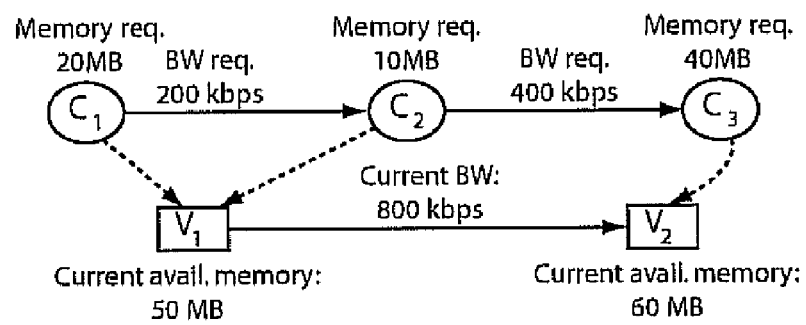
FIG. 4 is a diagram illustrating a congestion aggregation calculation 400.

Regarding step 3 (optimal composition selection) in FIG. 3, all the probes 201 belonging to a composition request will return to the initial deputy node 202. First, if the function graph is a DAG, then the deputy node 202 derives complete component graphs by merging the probed component paths. For example, in FIG. 2, which is a diagram illustrating an adaptive composition probing 200, a probe 201 can traverse $c_{10} \rightarrow c_{20} \rightarrow c_{40} \rightarrow c_{60}$ or $c_{10} \rightarrow c_{30} \rightarrow c_{50} \rightarrow c_{60}$. These two component paths can be merged into a complete component graph. Second, the deputy node 202 calculates the residual resources and accumulated QoS values for the candidate component graphs based on the precise state information collected by the probes. Third, the deputy node 202 selects qualified component compositions according to the constraints specified by Equations 2-5. Fourth, the deputy node 202 selects the optimal component composition from all the qualified ones according to the congestion aggregation metric $\phi(\xi)$ defined by Equation 1. For example, in FIG. 4, which is a diagram illustrating a congestion aggregation calculation 400, the residual resource aggregation for the candidate component composition is calculated as:

$$\phi(\lambda) = \frac{20}{20+20} + \frac{10}{20+10} + \frac{40}{20+40} + \frac{200}{\infty+200} + \frac{400}{400+400} = 2.$$

The qualified composition with the smallest $\phi(\xi)$ value is the optimal component composition. If two components are located on the same node (e.g., $c_1$ and $c_2$), then the residual bandwidth is set $\infty$ since the virtual link between two co-located components do not consume any network bandwidth.

Regarding step 4 (application session setup), the deputy node 202 finally establishes the stream processing application session by sending confirmation messages along the selected component composition. The confirmation message makes transient resource allocation permanent on the selected nodes and virtual links. If no qualified component composition can be found, then the deputy node 202 returns a failure message.

A description will now be given regarding hierarchical state management.

The hierarchical state management includes fine-grain local state update and coarse-grain global state maintenance. The local state of a node includes the QoS/resource states of its neighbor nodes in the overlay mesh, and its adjacent overlay links. Each node keeps its local state with high precision using frequent proactive measurement at short time intervals (e.g., 10 seconds, of course other time intervals may be used). For scalability, the precise local state is not disseminated to other nodes.

The global state includes: (1) the QOS and resource states of all nodes; and (2) the QoS and resource states of all virtual links between all pairs of nodes. Since each node can provide multiple stream processing components, the QoS states of each node includes the QoS states of all the stream processing components it provides. For scalability, the global state update is performed at a coarse-grain level. The global state update is triggered only when the QoS and resource state changes on a node or an overlay link exceeds a pre-specified (e.g., large) threshold. Thus, many insignificant state variations are filtered out to reduce the global state maintenance overhead. For example, a node updates its available memory state in the global state only when the available memory variation is larger than 100 KB or some other pre-specified amount. Similarly, a node updates the available bandwidth of its adjacent overlay link in the global state only when the available bandwidth variation is more than 200 kbps or some other pre-specified amount. It is to be appreciated that the preceding parameters are merely illustrative and, thus, other values may be used for available memory variation and available bandwidth variation, while maintaining the scope of the present invention.

One complication in the global state update is that each virtual link is an overlay path that includes several overlay links. Thus, the virtual link state update requires further aggregation from the states of its constituent overlay links. For example, it is desired to update the available bandwidth of a virtual link $(l_i)$ in the global state, which is mapped to an overlay path $l_i = \langle e_1, \ldots, e_k \rangle$. Then, the available bandwidth of $l_i$ is calculated from the available bandwidth of its constituent overlay links: $ba^{l_i} = \min(ba^{e_i}, \ldots, ba^{e_k})$. Similarly, the QoS values (e.g., delay, loss rate, and so forth) for the virtual link $l_i$ are to be calculated before the state of the virtual link $l_i$ can be updated in the global state. Thus, one node (e.g., the least loaded node) is selected as the aggregation node to calculate the states of all virtual links. All other nodes send significant QOS/resource state changes of their adjacent overlay links to the aggregation node. The aggregation node periodically updates the global state with the states of all virtual links between all pairs of nodes in the overlay mesh at pre-specified (e.g., large) time interval (e.g., 10 minutes or some other pre-specified time interval). For load sharing, the aggregation role is rotated among all the nodes (e.g., round robin, least loaded first, and so forth).

The distributed hash table (DHT) system is used to store the global state for scalability and failure resilience. Thus, the global state storage load and query computation load can be distributed among all nodes. The global state hash table records the coarse-grain QoS/resource states of all nodes and virtual links in the form of <node identifier, coarse-grain QoS/resource states> and <link identifier, coarse-grain QoS/resource states>. If a node wants to acquire the coarse-grain QoS/resource states about a specific node or a virtual link, then the node can query the global state hash table using the node identifier or link identifier. The DHT system can evenly partition the global state hash table and distribute hash table entries among all nodes.

A description will now be given regarding adaptive probe number selection.

The approach for deciding the number of probes used for each request will now be described. The concept of probing ratio will now be defined. If a function $F_i$ has $k_i$ candidate components and the probing ratio is $\alpha$, then ACP will use $\lceil \alpha \cdot k_i \rceil$ probes to examine $\lceil \alpha \cdot k_i \rceil$ candidate components for the function $F_i$. Intuitively, the larger the probing ratio is, the better composition performance the ACP can achieve since more candidate compositions are examined. However, larger probing ratio also means larger probing overhead since more probes are generated. Thus, the probing ratio represents a tuning knob to control the trade-off between composition performance and probing overhead. Composition success rate $\mu(t)$ is used to characterize the composition performance of the system at sampling time (t). The composition success rate is calculated as follows:

$$\mu(t) = \frac{SuccesNum(t)}{RequestNum(t)},$$

where SuccesNum(t) denotes the number of successful compositions during last sampling period [t-$\Delta$t,t] and RequestNum(t) denotes the number of total composition requests during [t-$\Delta$t,t]. A higher composition success rate $\mu(t)$ indicates better optimal component composition performance at time t. The probing ratio value at time t is denoted by $\alpha(t)$.

Figure 5A:
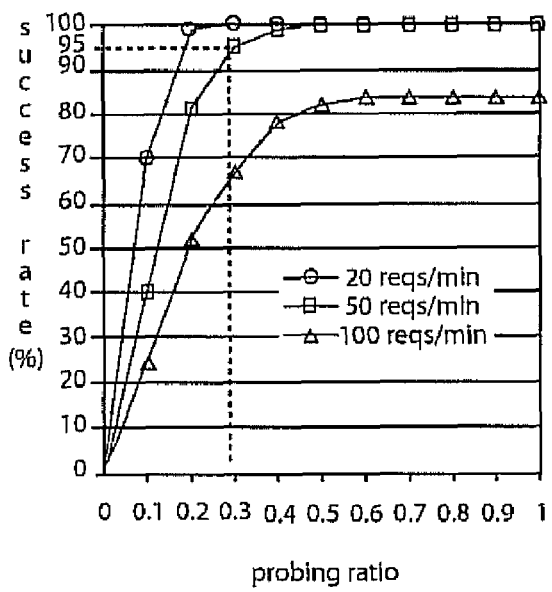
FIG. 5A is a plot 510 illustrating composition performance (success rate) versus probing ratio under different request rates.
Figure 5B:
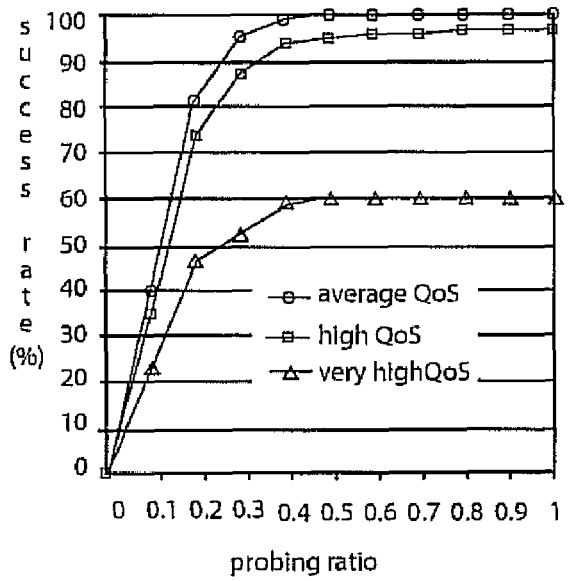
FIG. 5B is a plot 550 illustrating composition performance (success rate) versus probing ratio under different QoS requirements.

Ideally, ACP should always use the minimal probing ratio $\alpha(t)$ for achieving a target composition success rate $\mu(t)$ under different system conditions (e.g., workload, QoS/resource requirements). For example, FIGS. 5A and 5B are plots 510 and 550 illustrating composition performance (i.e., success rate) as a function of probing ratio under increasing workload and higher QoS requirements. The number of requests submitted per minute is denoted using the request rate. A higher request rate represents larger workload. For example, in FIG.

5A, if it desired to achieve $\mu(t)=95\%$ composition success rate when the request rate is 50 requests per minute, then the ACP should set the probing ratio $\alpha(t)=0.3$. However, the challenge of probing ratio tuning is that the mapping from probing ratio to success rate is non-linear and dynamic. The mapping function can be affected by different system conditions (e.g., request rate, QoS/resource requirements) in a dynamic distributed stream processing system. For example, FIG. 5A illustrates the mapping functions from probing ratio to composition success rate under different request rates. FIG. 5B illustrates the composition success rate as a function of the probing ratio under different QoS requirements. Higher QoS means shorter processing time and lower loss rate requirements.

To address the problem, ACP performs on-line profiling to dynamically derive the current mapping function from probing ratio to composition success rate. Based on the profiling results, ACP can predict the minimal probing ratio $\alpha(t)$ given a target success rate $\mu(t)$. It is presumed that the target success rate is achievable. ACP stops increasing the probing ratio if the probing overhead already reaches its limit. The on-line profiling is triggered when the prediction error exceeds a certain threshold $\delta$ (e.g., $\delta=2\%$), which means that the system conditions have changed. For example, if the target success rate is $\mu(t)$, then ACP predicts the minimal probing ratio $\alpha(t)$ based on the current profiling results. At the end of this sampling period, ACP gets the measured success rate $\mu(t)$. If $|\mu(t)-\mu'(t)|>\delta$, then profiling is triggered to derive the new mapping function from the probing ratio to the composition success rate.

Since ACP is highly efficient, the success rate increases very quickly and reaches the saturation value (i.e., the highest achievable success rate) at a small probing ratio, illustrated by FIGS. 5A and 5B. Thus, the probing ratio tuning space is very limited, which makes probing ratio profiling a simple task. The profiling process starts from the base probing ratio (e.g., $\alpha=0.1$) and gradually increases the probing ratio at a certain step (e.g., 0.1) until the success rate hits the saturation value. To guarantee high prediction accuracy, profiling should use a realistic workload that is representative of the current system conditions (e.g., request rate, QoS requirements, resource requirements, application templates, and so forth). Such a workload can be the trace replay of actual workloads in the last sampling period.

A description will now be given regarding per-hop component selection.

After the deputy node decides the probing ratio, the deputy node executes the ACP protocol to send out composition probes. When a node $v_i$ receives a probe, the node $v_i$ needs to decide which next-hop candidate components to examine under the probing ratio constraint. For example, if the next-hop function $F_i$ has $k_i$ candidate components and the probing ratio is $\alpha$, then the node $v_i$ is allowed to probe $\lceil \alpha \cdot k_i \rceil$ candidate components for $F_i$. Under the guidance of the coarse-grain global state, $v_i$ selects the M best candidate components as described in the following three steps.

In the first step, $v_i$ queries the global state to retrieve the coarse-grain QoS/resource states of all candidate components $c_1, \ldots, c_k$ and virtual links $l_1, \ldots, l_k$ to the candidate components. The QoS states of the candidate component $c_i$ and the virtual link $l_i$ are described by $[q_1^{c_i}, \ldots, q_m^{c_i}]$ respectively. The resource states of the candidate component $c_i$ include current resource availabilities $[ra_1^{c_i}, \ldots, ra_n^{c_i}]$. The resource states of the virtual link $l_i$ include its current available bandwidth $ba^{l_i}$. On the other hand, $v_i$ acquires the resource/QoS requirement information from the received probe. The end-system resource requirements of the application are denoted using $[r_1^{c_i}, \ldots, r_n^{c_i}]$, and the bandwidth requirement of the user is denoted using $b^{l_i}$. The residual resources of $c_i$ are calculated as $rr_i^{c_i}=ra_i^{c_i}-r_i^{c_i}$, and the residual bandwidth of $l_i$ is calculated as $rb^{b_i}=ba^{l_i}-b^{l_i}$.

In the second step, $v_i$ filters out unqualified candidate components by checking the input/output stream rate compatibility between the current-hop component and candidate next-hop components. Then, $v_i$ further removes unqualified candidate components according to the QoS/resource requirements of the user and the state information retrieved from the global state. The user's QoS requirements for the composed stream processing application are denoted using $[q_1^{req}, \ldots, q_m^{req}]$. It is presumed that the S accumulated QOS values of the probed partial component composition are $q_1^\xi, \ldots, q_m^\xi$. A candidate component $c_i$ is unqualified if any of the following inequalities is true:

$$q_i^\lambda + q_i^{c_i} + q_i^{l_i} > q_i^{req}, \exists i, 1 \leq i \leq m \qquad (6)$$

$$ra_i^{c_i} < r_i^{c_i}, \exists i, 1 \leq i \leq n \qquad (7)$$

$$ba^{l_i} < b^{l_i} \qquad (8)$$

Equation 6 means that the user's QoS constraints cannot be satisfied. Equation 7 means that the candidate component $c_i$ cannot meet the end-system resource requirements. Equation 8 means the virtual link to $c_i$ cannot meet the bandwidth requirement.

In the third step, $v_i$ further selects good candidate components from the above derived qualified components. It is presumed that $v_i$ finds Z qualified candidate components. If $Z \leq M$, then $v_i$ can probe all the qualified candidate components satisfying the probing ratio constraint. Otherwise, $v_i$ needs to select M best qualified components from Z qualified ones. The virtual link from the current component to $c_i$ is denoted using $l_i$. To meet the multi-constrained QoS requirements $[q_1^{req}, \ldots, q_m^{req}]$ a risk function $D(c_i)$ is defined for a candidate component $c_i$ as follows:

$$D(c_i) = \max\left(\frac{q_1^\lambda + q_1^{c_i} + q_1^{l_i}}{q_1^{req}}, \ldots, \frac{q_m^\lambda + q_m^{c_i} + q_m^{l_i}}{q_m^{req}}\right) \qquad (9)$$

The larger the ratio value $$\frac{q_i^\lambda + q_i^{c_i} + q_i^{l_i}}{q_i^{req}}$$

is, the more closely the QoS accumulation $(q_i^\xi + q_i^{c_i} + q_i^{l_i})$ approaches its constraint $q_i^{req}$. The candidate components with smaller risk function values are considered as better components since their maximum QOS violation risk values are smaller. Thus, $c_i$ is a better candidate component to probe than $c_j$ if $D(c_i) < D(c_j)$. If two candidate components have similar risk function values, the two candidate components are compared based on the load distribution goal. A congestion function $W(c_i)$ is defined as follows:

$$W(c_i) = \sum_{k=1}^{n} \frac{r_k^c}{rr_k^{c_i} + r_k^{c_i}} + \frac{b^{l_i}}{rb^{l_i} + b^{l_i}} \qquad (10)$$

The component with smaller $W(c_i)$ values is a better candidate to probe since it is less loaded. The candidate component selection approach described above essentially ensures that probes traverse along "good" candidate compositions. The fine-grain QoS/resource states collected by the probes will be used to select the best component composition. Thus, ACP can most efficiently find the optimal component composition although ACP only examines a subset of all candidate compositions.

These and other features and advantages of the invention may be readily ascertained by one of ordinary skill in the pertinent art based on the teachings herein. It is to be understood that the teachings of the invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the invention is not limited to those precise embodiments, and that various changes and modifications may be effected therein by one of ordinary skill in the pertinent art without departing from the scope or spirit of the invention. All such changes and modifications are intended to be included within the scope of the invention as set forth in the appended claims.

What is claimed is:

1. A system having a processor and a memory for optimizing component composition in a distributed stream-processing environment having a plurality of nodes capable of being associated with one or more of a plurality of stream processing components, the system further comprising: an adaptive composition probing (ACP) module which probes a subset of the plurality of stream processing components to determine the optimal component composition in response to a stream processing request; and a hierarchical state manager which manages local and global information for use by said ACP module in determining the optimal component composition.

2. The system according to claim 1, wherein said ACP module adaptively determines the number of probes used for the stream processing request based on at least one of system performance targets and current system conditions.

3. The system according to claim 1, wherein said ACP module adaptively performs per-hop component selection based on at least one of coarse-grain global states, accumulated probing results, and stream rate matching.

4. The system according to claim 1, wherein said hierarchical state manager manages global states in a coarse-grained manner and local states in a fine-grained manner.

5. The system according to claim 1, wherein function, Quality of Service (QoS) and resource needs are allowed to be specified for selecting the component composition.

6. The system according to claim 1, wherein the component composition is determined so as to optimize at least one objective function with respect to load balancing.

7. The system according to claim 6, wherein the determination of the optimal component composition is subject to system and performance constraints.

8. The system according to claim 7, wherein the system and performance constraints comprise at least one of Quality of Service (QoS), resource needs, and rate matching.

9. A method for optimizing component composition in a distributed stream-processing environment having a plurality of nodes capable of being associated with one or more of a plurality of stream processing components, the method comprising the steps of:
performing an adaptive composition probing (ACP) which probes a subset of the plurality of stream processing components to determine the optimal component composition in response to a stream processing request; and
managing local and global information for use by said performing step in determining the optimal component composition.

10. The method according to claim 9, wherein said performing step adaptively determines the number of probes used for the stream processing request based on at least one of system performance targets and current system conditions.

11. The method according to claim 9, wherein said performing step adaptively performs per-hop component selection based on at least one of coarse-grain global state information, accumulated probing results, and stream rate matching.

12. The method according to claim 9, wherein said managing step manages global states in a coarse-grained manner and local states in a fine-grained manner.

13. The method according to claim 9, wherein function, Quality of Service (QoS) and resource needs are allowed to be specified for selecting the component composition.

14. The method according to claim 9, wherein the component composition is determined so as to optimize at least one objective function with respect to load balancing.

15. The method according to claim 14, wherein the determination of the optimal component composition is subject to system and performance constraints.

16. The method according to claim 15, wherein the system and performance constraints comprise at least one of Quality of Service (QoS), resource needs, and rate matching.

17. A program storage device readable by machine, tangibly embodying a program of instructions executable by the machine to perform method steps for optimizing component composition in a distributed stream-processing environment having a plurality of nodes capable of being associated with one or more of a plurality of stream processing components, the method steps comprising:
performing an adaptive composition probing (ACP) which probes a subset of the plurality of stream processing components to determine the optimal component composition in response to a stream processing request; and
managing local and global information for use by said performing step in determining the optimal component composition.

18. The program storage device according to claim 17, wherein said performing step adaptively determines a number of probes used for the stream processing request based on at least one of system performance targets and current system conditions.

19. The program storage device according to claim 17, wherein said performing step adaptively performs per-hop component selection based on at least one of coarse-grain global state information, accumulated probing results, and stream rate matching.

20. The program storage device according to claim 17, wherein said managing step manages global states in a coarse-grained manner and local states in a fine-grained manner.

21. The program storage device according to claim 17, wherein function, Quality of Service (QoS) and resource needs are allowed to be specified for selecting the component composition.

22. The program storage device according to claim 17, wherein the component composition is determined so as to optimize at least one objective function with respect to load balancing.

23. The program storage device according to claim 22, wherein the determination of the optimal component composition is subject to system and performance constraints.

24. The program storage device according to claim 23, wherein the system and performance constraints comprise at least one of Quality of Service, resource needs, and rate matching.

* * * * *